United States Patent [19]
Friesen

[11] Patent Number: 6,024,374
[45] Date of Patent: Feb. 15, 2000

[54] PORTABLE TRAILER HITCH ATTACHMENT FOR A DOLLY

[76] Inventor: Delton Friesen, 1663 E. Impala Ave., Mesa, Ariz. 85204

[21] Appl. No.: 08/980,582

[22] Filed: Dec. 1, 1997

[51] Int. Cl.[7] .................................................. B60D 1/06
[52] U.S. Cl. ........................................ 280/511; 280/47.27
[58] Field of Search ................................ 280/504, 511, 280/476.1, 47.24, 47.27, 47.28

[56] References Cited

U.S. PATENT DOCUMENTS

| | | | |
|---|---|---|---|
| 1,902,834 | 3/1933 | Cohen-Venezian | 280/47.24 |
| 2,723,130 | 11/1955 | Andrews | 280/47.19 |
| 3,337,228 | 8/1967 | Shulkin | 280/47.27 |
| 3,622,181 | 11/1971 | Smith | 280/476 |
| 3,837,677 | 9/1974 | Haskins | 280/476 |
| 4,365,925 | 12/1982 | Girtz | 280/47.27 |
| 4,505,489 | 3/1985 | Specie | 280/47.13 |
| 4,566,708 | 1/1986 | Specie | 280/47.13 |
| 5,071,151 | 12/1991 | Irwin | 280/476.1 |
| 5,139,102 | 8/1992 | Pocapalia | 180/19.2 |
| 5,351,982 | 10/1994 | Walrath | 280/504 |

FOREIGN PATENT DOCUMENTS

| | | | |
|---|---|---|---|
| 2469301 | 5/1981 | France | 280/511 |
| 1655012 | 11/1970 | Germany | 280/511 |
| 2264474 | 9/1993 | United Kingdom | 280/511 |

*Primary Examiner*—Anne Marie Boehler
*Assistant Examiner*—Avraham Lerner
*Attorney, Agent, or Firm*—Ellis, Venable, Busam & Wittenberg, LLP

[57] ABSTRACT

A device, or attachment, that allows a person to manually transport small to medium-sized trailers that have a mechanism for receiving a trailer hitch. The device, which attaches to the flat bed portion of a standard dolly, comprises an angled trailer hitch that attaches to the topside of a first substantially flat plate at an obtuse angle with respect to a front end of the first flat plate. There is a second substantially flat plate that is generally parallel to the first flat plate both plates attach to each other at back ends, respectively. The two flat plates are separated by a distance that allows a third flat plate, typically a part of the dolly, to be inserted and secured between them. Once the device is attached to the dolly, a user engages the trailer hitch portion of the present invention to a trailer, and manually transports the trailer using the dolly as the mechanism for directing the trailer.

7 Claims, 5 Drawing Sheets

PORTABLE TRAILER HITCH ATTACHMENT FOR A DOLLY

FIELD OF THE INVENTION

The present invention relates to the art of manual transportation art, and has particular reference to a device capable of attaching to a standard mobile dolly that allows a user to move vehicular trailers. More particularly, the present invention involves the use of a pair of parallel metal plates with an attached trailer hitch. The parallel plates may be secured to the flat bed portion of a standard dolly.

BACKGROUND

The standard method of transporting small to medium-sized trailers is with the use of a vehicle such as an automobile or truck. The vehicle generally has a standard steel trailer hitch secured to its rear portion. The trailer generally contains a device capable of receiving the trailer hitch and securing it, such that motorized vehicle may pull the trailer to its destination.

Because larger trailers are usually heavier, they require a motorized vehicle using this method to transport the trailer. However, for smaller trailers, such as those that transport jet skis or other small loads, the use of a motorized vehicle may not be necessary. For individuals who may not own a motorized vehicle, or for the movement of smaller loads over relatively short distances, a simpler method of transportation would be desirable.

Prior inventions have included various devices for transporting trailers. For example, U.S. Pat. No. 4,505,489 issued to Specie, discloses a dolly system for campgrounds, parks etc. that consists of a general purpose dolly and various attachments for the general purpose dolly. The patent generally discloses the use of an adaptable attachment for use on a dolly. However, the Specie patent does not make specific reference to a device that would include two parallel plates that may be attached to a basic flat-planed dolly. Also the combination of the two parallel plates with the trailer hitch is not specifically disclosed.

U.S. Pat. No. 4,566,708 also issued to Specie, was a continuation of the above Specie patent. This patent discloses a dolly system for campgrounds, parks etc. that consists of a general purpose dolly and various attachments for the general purpose dolly. The patent generally discloses the use of an adaptable attachment for use on a dolly. However, it does not make specific reference to the present invention that includes two parallel plates that may be attached to a basic flat-planed dolly. Also the combination of the two parallel plates with the trailer hitch is not specifically disclosed.

U.S. Pat. No. 2,723,130 issued to Andrews, discloses a support for outboard motors for boats. This generally discloses a figure with a trailer hitch attached to what appears to be a dolly. However, the figure does not disclose the means of securing the trailer hitch to the dolly as set forth in the present invention.

U.S. Pat. No. 3,622,181 issued to Smith discloses a vehicular device for safe and convenient launching of small pleasure boats and the like form soft ground or from dirt ramps. The patent also discloses a figure showing a trailer hitch attached to a dolly-like device. However, the figure does not disclose a system of parallel plate securing devices for use on a dolly with an attached trailer hitch.

U.S. Pat. No. 3,837,677 issued to Haskins, discloses a stabilizing trailer hitch dolly consists of a dolly frame and a cross member carrying a trailer hitch ball. The patent includes a figure showing a trailer hitch attached to a dolly-like device. However, as in the Smith patent, the patent does not disclose a system of parallel plate securing devices for use on a dolly with an attached trailer hitch.

Other patented devices discuss similar approaches to manually transporting trailers using a trailer hitch. However, none of these patented inventions include a parallel plate attachment for securing a trailer hitch to a standard dolly. The flexibility and simplicity that allows a user to change attach such a device to a dolly, and allows the user to transport the trailer without a motor vehicle, is a substantial improvement over the prior art.

SUMMARY OF THE INVENTION

It is an object of the present invention to provide a device for manually transporting trailers.

It is a further object of the present invention for the device to consist of a rigid trailer hitch fixedly attached to an object that secures the trailer hitch to a standard dolly.

It is a further object of the present invention for the object for securing the trailer hitch to the standard dolly to consist of a pair of rigid parallel plates that may slide over the flat bed portion of the standard dolly.

It is a further object of the present invention for the rigid parallel plates to be secured over the flat bed portion of the standard dolly by a series of adjustable nut and bolt fixtures.

It is a further object of the present invention for the trailer hitch to be attached to the standard dolly in such a way that the trailer hitch may easily be secured to a trailer by rotating the standard dolly to a point where the trailer hitch, and a receiving means for the trailer may be secured to each other.

It is a further object of the present invention for the standard dolly to be used to manually transport the trailer after the trailer hitch and the receiving means for the trailer have been secured to each other.

BRIEF DESCRIPTION OF THE DRAWINGS

The novel features that are considered characteristic of the invention are set forth with particularity in the appended claims. The invention itself, however, both as to its structure and its operation together with the additional object and advantages thereof, will best be understood from the following description of the preferred embodiment of the present invention when read in conjunction with the accompanying drawings wherein:

DESCRIPTION OF PREFERRED EMBODIMENTS

Described below is the preferred embodiment of the present invention. Many of the features of the different embodiments are fabricated in a similar manner. Where variances in the construction of the various embodiments exist, these variations will be discussed together in the same section.

Figure 1:
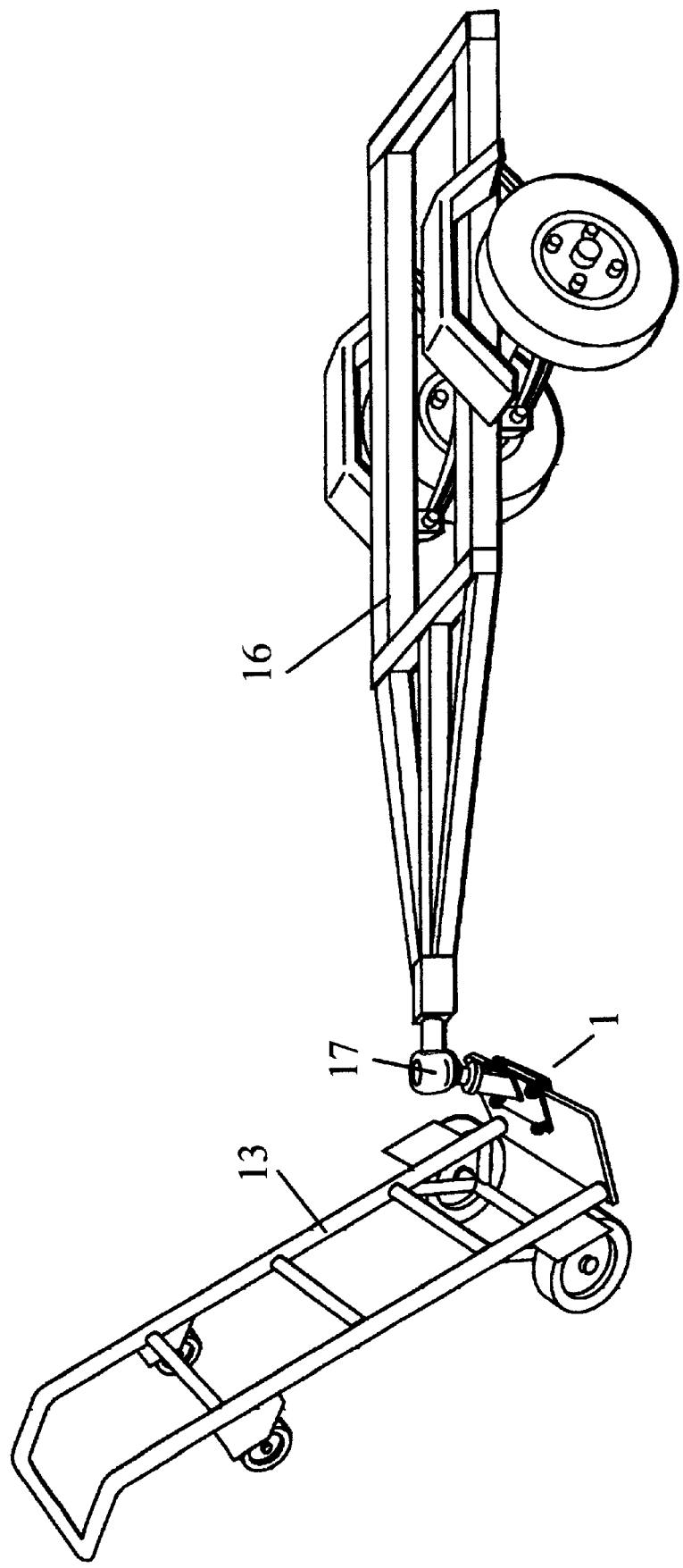
FIG. 1 is a view of the device in actual use on a standard dolly showing the dolly utilizing the device to pull a standard trailer.

Referring to FIG. 1, the figure displays a device 1 that is securely attached to a standard dolly 13, and enables an individual to manually transport a trailer 16. The trailer 16 contains a receiving portion for a trailer hitch 17.

Figure 2:
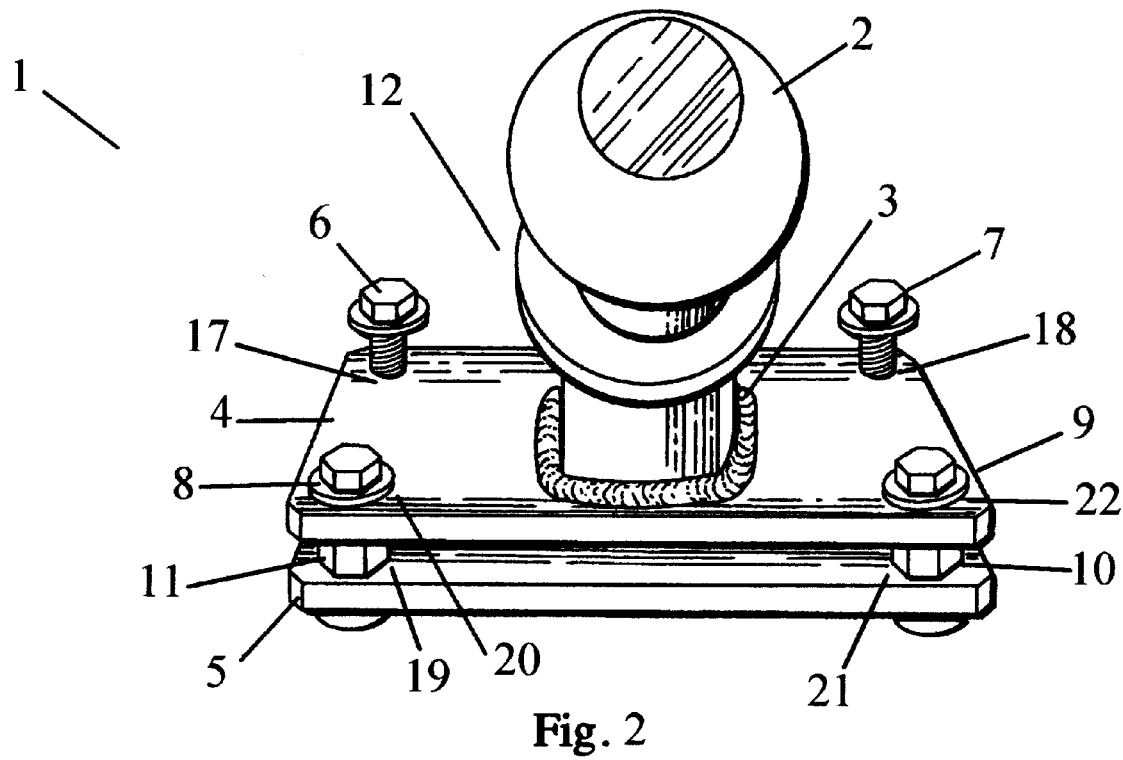
FIG. 2 illustrates a front view of the device.
Figure 3:
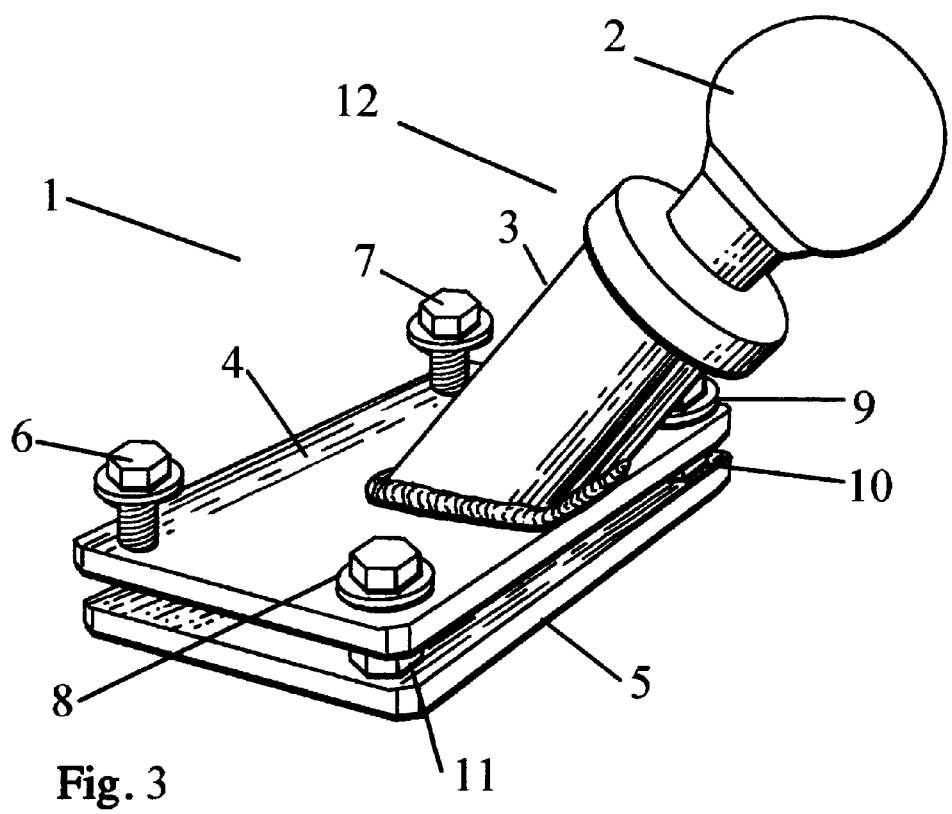
FIG. 3 is a perspective view of the device.
Figure 4:
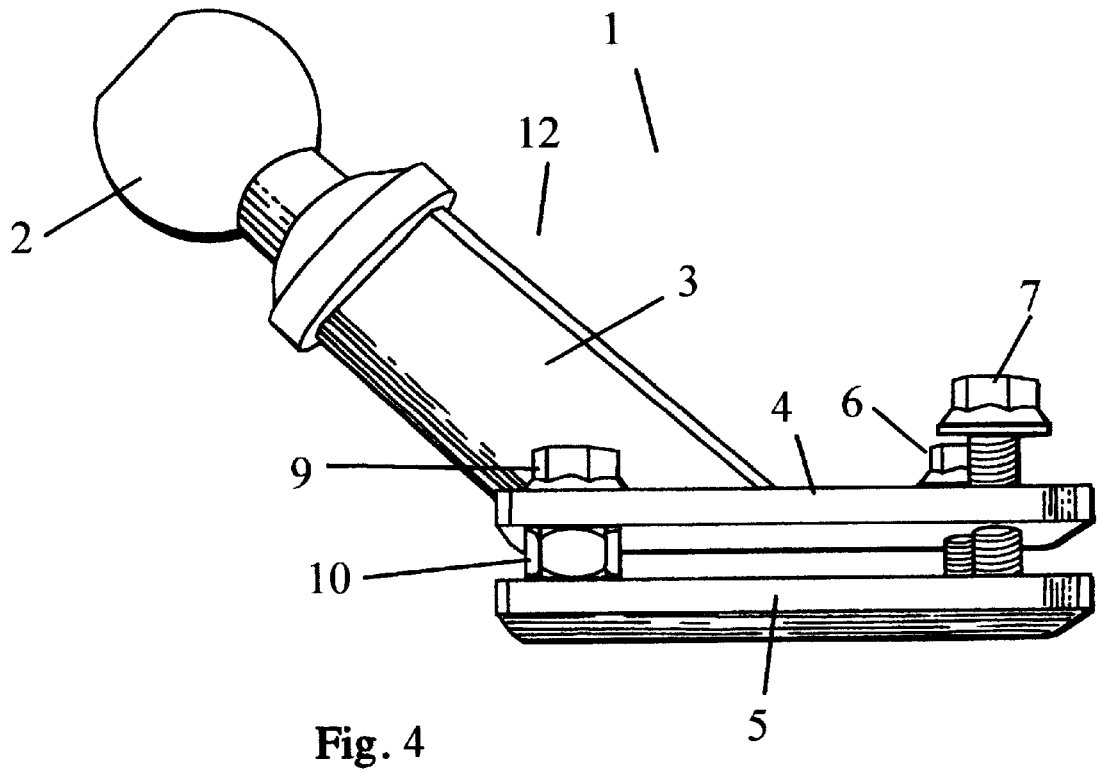
FIG. 4 is a side view of the device.
Figure 5:
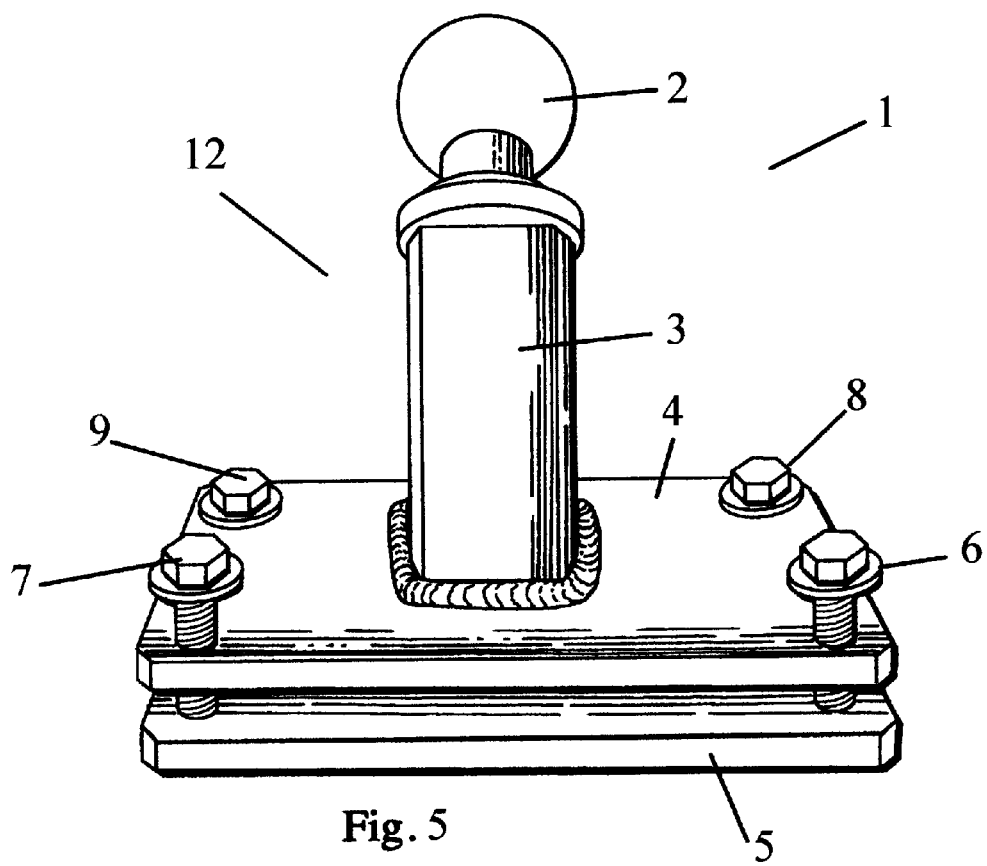
FIG. 5 is a rear view of the device.
Figure 6:
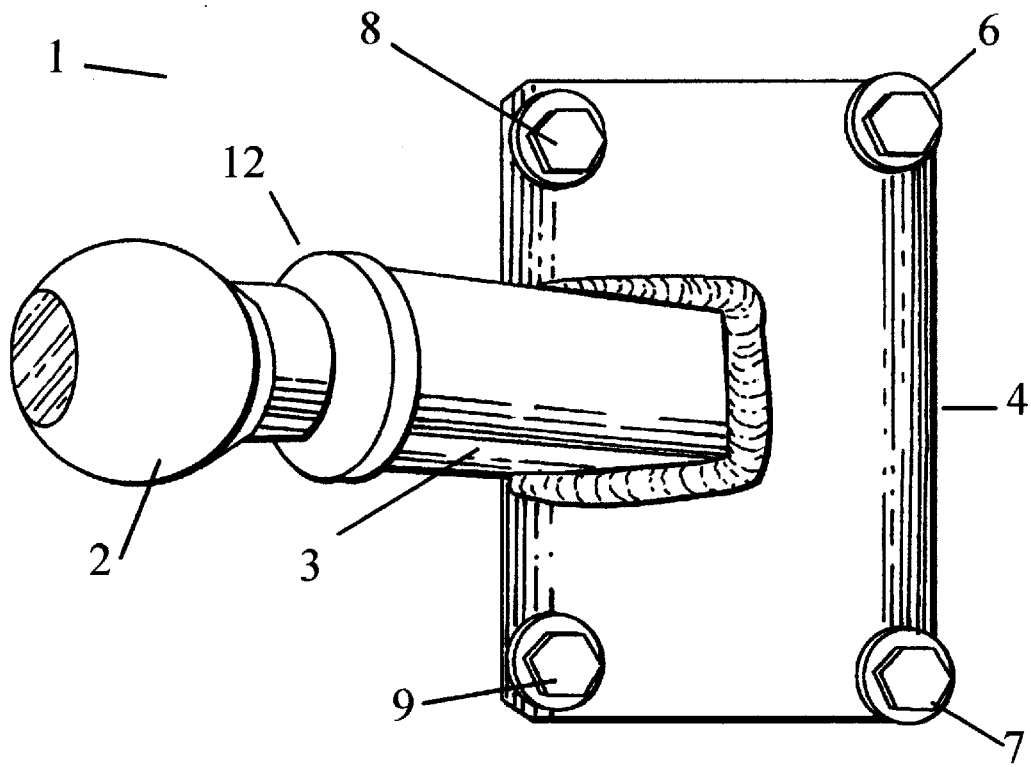
FIG. 6 is a top view of the device.
Figure 7:
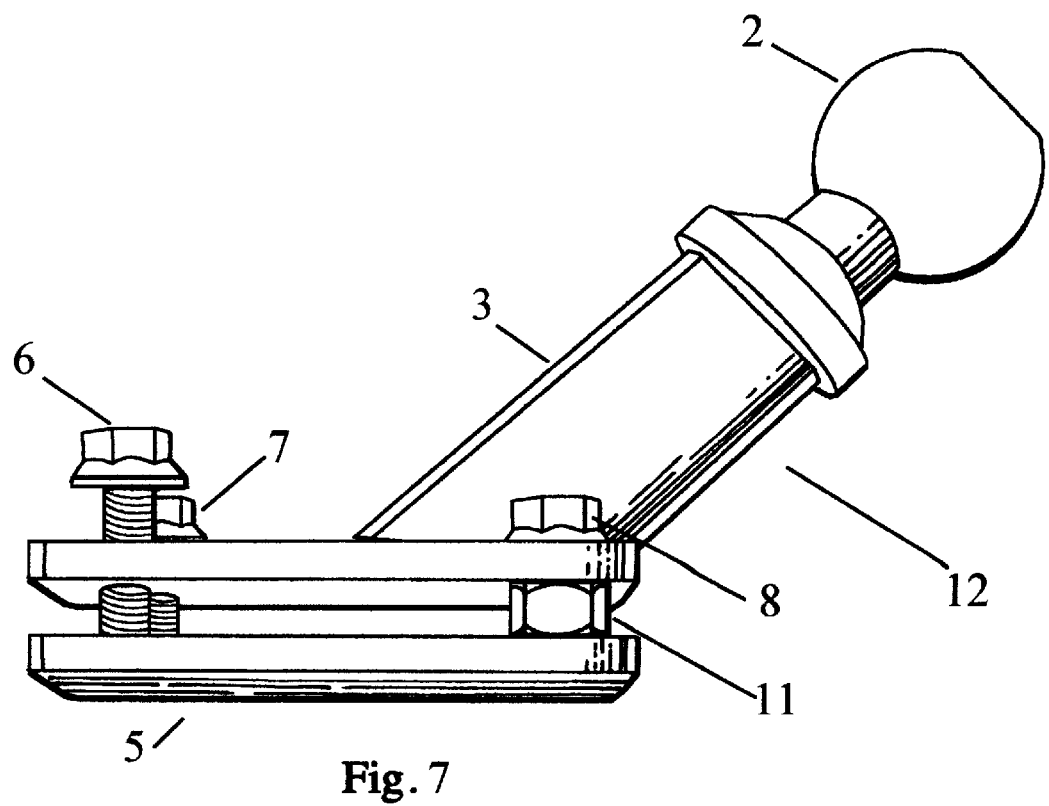
FIG. 7 is an alternate side view of the device.

Referring to FIG. 2, the figure displays the device 1 that consists of a trailer hitch 12, that is connected to a first steel plate 4. The trailer hitch is comprised of a solid stainless steel ball 2 connected to a steel rod 3. At the point where the rod 3 connects to the first steel plate 4, the rod is generally attached to the front end of the first steel plate 4 such that the combination of the rod 3 and the steel ball 2 together form an obtuse angle. A second steel plate 5 is connected to the first steel plate 4 by means of a pair of bolts 8 and 9, and nuts 10 and 11. The first steel plate 4 has four threaded holes 17, 18, 20, and 22 that are capable of receiving bolts 6, 7, 8, and 9. The second steel plate 5 has two threaded holes 19 and 21. The nut 11 is placed in alignment between the holes, 19 and 20, while the nut 10 is placed in alignment between the holes 21 and 22. The bolts 8 and 9 are screwed and tightened through nuts 11 and 10 respectively, thereby making the first steel plate 4 parallel to the second steel plate 5. The nuts 10 and 11 are generally of a height that will allow the flat bed portion 14 (shown in FIG. 7) of the dolly 13 to fit in between the first steel plate 4 and the second steel plate 5. Bolts 6 and 7 may be screwed into threaded holes 17 and 18 respectively. When flat bed 14 is inserted between the first and second steel plates 4 and 5 respectively as shown in FIG. 8, the bolts 6 and 7 may be screwed into threaded holes 17 and 18 respectively in order to secure the device 1 from detaching from the dolly 13.

Other methods for securing the device 1 to the flat bed portion 14 of the dolly 13 include using a clamping mechanism to secure the front ends of the first and second steel plates 4 and 5 respectively. Another method may include providing a single U-shaped device wherein the two legs of the U-shaped device would replace the first and second steel plates 4 and 5. The base of the U-shaped device would be slightly larger in height, than the width of the flat bed portion 14 of the dolly 13 such that the entire U-shaped device would slide over the flat bed portion 14 of the dolly 13.

Referring to FIGS. 3–7, the figures generally show the various views of the device 1 in FIG. 2.

Figure 8:
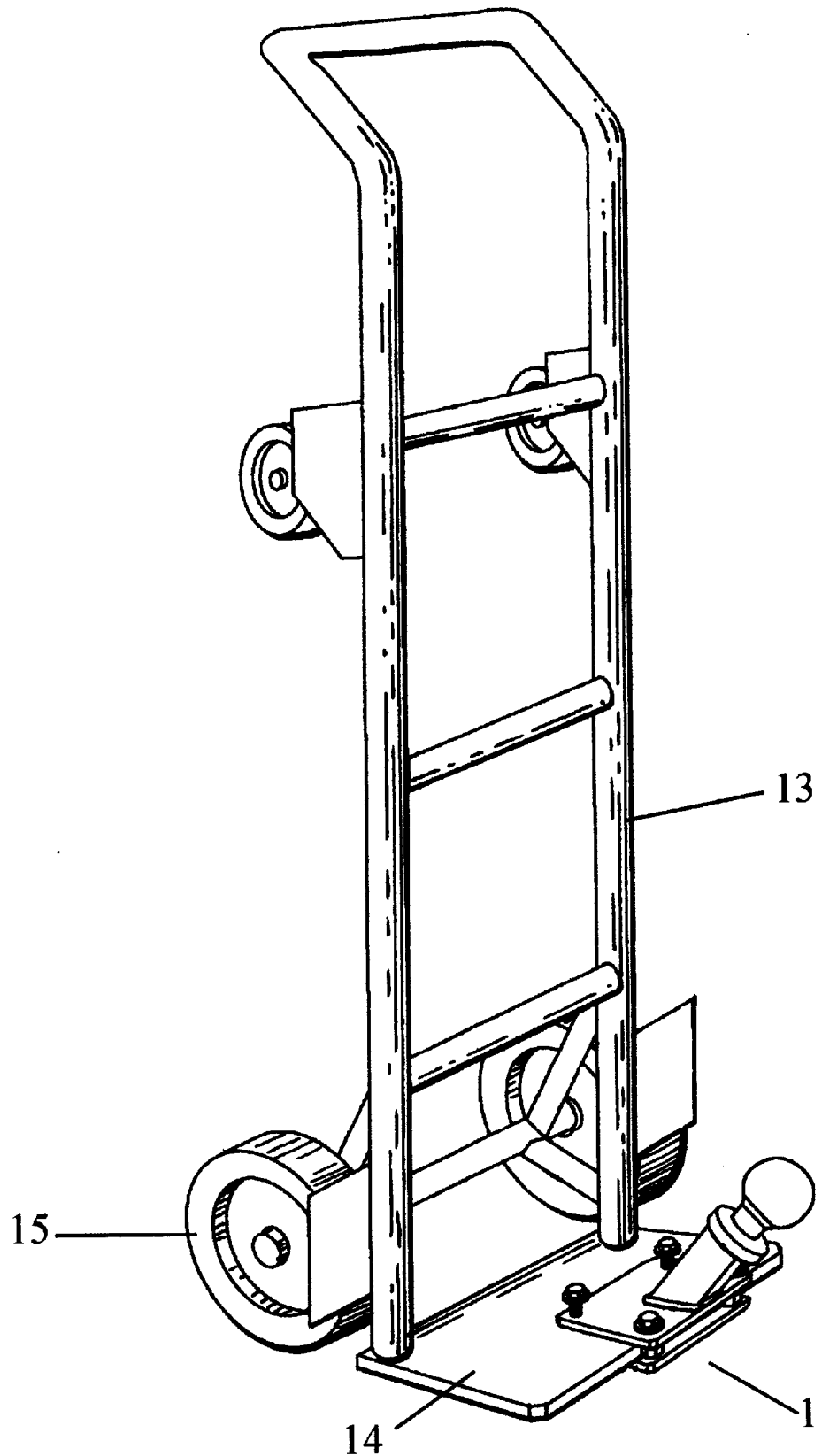
FIG. 8 is a view of the device in actual use on a standard dolly.

Referring to FIG. 8, the standard dolly 13 is shown. The dolly 13 is normally used for efficiently transporting boxes or other items by stacking the boxes on the flat bed portion 14. An individual may then tilt the dolly 13 backwards rotating along the axis of wheels 15, and then by pushing or pulling the dolly 13, may move the boxes to the desired location. However, in the present invention, the dolly 13, is used as a mechanism to transport the trailer 16, shown in FIG. 1, by attaching and securing the device 1, to the approximate middle of the flat bed portion 14, and tightening nuts 6 and 7 to the flat bed portion 14 such that the device 1 is stabilized. The trailer 16 is transported by rotating the dolly 13 to an angle that will allow the inserting of the steel ball 2 into the receiving portion of the trailer 17 shown in FIG. 1. It is desirable to maintain the angle of the trailer hitch 12 with respect to the first steel plate 4 in such a way that the trailer hitch 12 will be approximately perpendicular to the ground when transporting the trailer 16. Once the steel ball 2 is inserted into the receiving portion of the trailer 17, the individual may then push or pull the trailer to a desired location along the wheels 15 of the dolly 13 as shown in FIG. 1.

It is understood that those skilled in the art may conceive modifications and/or variations to the specific embodiments shown and described herein. Any such modifications or variations which fall within the purview of this description are intended to be included therein as well. It is understood that the description herein in intended to be illustrative only and is not intended to be limiting. Rather, the scope of the invention described herein is limited only by the claims appended hereto.

What is claimed is:

1. A device for assisting an individual in manually transporting a trailer comprising:

A. a trailer hitch having a top portion and a bottom portion,

B. a first and second substantially flat plate,

C. said first and second substantially flat plates each having,
 a. a top side,
 b. a bottom side,
 c. a front end,
 d. a back end, D. said bottom portion of said trailer hitch is fixedly attached to the top side of said first substantially flat plate wherein the trailer hitch is at an obtuse angle with respect to the front end of the first substantially flat plate, E. the back end of the first substantially flat plate is fixed attached to the back end of the second substantially flat plate such that the first and second substantially flat plates are parallel to each other, and are separated by a distance that a freely moving third substantially flat plate could be inserted between the first and second substantially flat plates and the attachment of the back end of the first substantially flat plate to the back end of the second substantially flat plate prevents the third substantially flat plate, when inserted, from sliding completely through the back ends of the first and second substantially flat plates.

2. The device in claim 1 wherein the top portion of said trailer hitch comprises a solid sphere and the bottom portion of said trailer hitch comprises a substantially rigid member, said solid sphere being fixedly attached to said substantially rigid member.

3. The device in claim 2 wherein the solid sphere is composed of stainless steel.

4. The device in claim 1 wherein the first and second substantially flat plates are composed of metal.

5. The device in claim 1 wherein the first and second substantially flat plates are secured to a dolly wherein, A. said dolly further comprises a flat bed portion, B. said first and second substantially flat plates being slidingly engaged with the flat bed portion of said dolly such that the first and second substantially flat plates cover a substantial portion of the flat bed portion of said dolly, C. the front end of said first substantially flat plate further comprises at least one threaded hole, D. said at least one threaded hole of said first substantially flat plate capable of receiving at least one bolt,
 a. said at least one threaded hole of said first substantially flat plate receiving said at least one bolt such that said at least one bolt serves to secure the device to the flat bed portion of said dolly.

6. The device in claim 1 wherein the means for fixedly attaching the back ends of the first and second substantially flat plates comprises, A. at least one nut,
B. at least one bolt,
C. said back ends of said first and second substantially flat plates including at least one threaded hole,
   a. said at least one threaded hole of said first substantially flat plate being aligned with said at least one threaded hole of said second substantially flat plate,
D. said at least one nut being aligned with, and placed between said at least one threaded holes of said first and second substantially flat plates,
E. said at least one bolt inserted through the at least one threaded holes of the first and second substantially flat plates and through the at least one nut.

7. A device for assisting an individual in manually transporting a trailer comprising:
   A. a trailer hitch having a top side and a bottom side,
   B. a first and second substantially flat plate,
   C. said first and second substantially flat plates each having a top side and a bottom side, as well as a front end and a back end,
   D. said bottom side of said trailer hitch is fixedly attached to the top side of said first substantially flat plate such that the trailer hitch is at an obtuse angle with respect to the front end of the first substantially flat plate,
   E. the back end of the first substantially flat plate is fixedly attached to the back end of the second substantially flat plate such that the first and second substantially flat plates are parallel to each other, and would prevent a third substantially flat plate from sliding completely through the back ends of the first and second substantially flat plates,
   F. the first and second substantially flat plates are secured to a dolly wherein, said dolly further comprises a flat bed portion, said first and second substantially flat plates being slidingly engaged with the flat bed portion of said dolly such that the first and second substantially flat plates cover a substantial portion of the flat bed portion of said dolly,
   G. the front end of said first substantially flat plate further comprises at least one threaded hole, said at least one threaded hole of said first substantially flat plate capable of receiving at least one bolt, said at least one threaded hole of said first substantially flat plate receiving said at least one bolt such that said at least one bolt serves to secure the device to the flat bed portion of said dolly.

* * * * *

UNITED STATES PATENT AND TRADEMARK OFFICE
CERTIFICATE OF CORRECTION

PATENT NO. : 6,024,374
DATED : February 15, 2000
INVENTOR(S) : Friesen

It is certified that error appears in the above-identified patent and that said Letters Patent is hereby corrected as shown below:

Column 4, line 27, change "fixed" to --fixedly --.

Signed and Sealed this

Twentieth Day of February, 2001

Attest:

NICHOLAS P. GODICI

Attesting Officer     Acting Director of the United States Patent and Trademark Office